(12) United States Patent
Lee et al.

(10) Patent No.: US 10,822,854 B2
(45) Date of Patent: Nov. 3, 2020

(54) SUPPORT APPARATUS

(71) Applicant: Jae H. Lee, Palisades Park, NJ (US)

(72) Inventors: Jae H. Lee, Palisades Park, NJ (US); Robert Barry, Hackettstown, NJ (US)

(73) Assignee: Jae Ho Lee, Palisades Park, NJ (US)

( * ) Notice: Subject to any disclaimer, the term of this patent is extended or adjusted under 35 U.S.C. 154(b) by 0 days.

(21) Appl. No.: 16/318,162

(22) PCT Filed: Jan. 5, 2018

(86) PCT No.: PCT/US2018/012468
§ 371 (c)(1),
(2) Date: Jan. 16, 2019

(87) PCT Pub. No.: WO2018/129239
PCT Pub. Date: Jul. 12, 2018

(65) Prior Publication Data
US 2019/0234128 A1    Aug. 1, 2019

Related U.S. Application Data

(60) Provisional application No. 62/442,480, filed on Jan. 5, 2017.

(51) Int. Cl.
*E05F 5/02* (2006.01)
*E05F 5/06* (2006.01)
(Continued)

(52) U.S. Cl.
CPC .............. *E05F 5/06* (2013.01); *E05C 17/443* (2013.01); *E05C 17/54* (2013.01); *E05C 19/188* (2013.01); *F16M 13/022* (2013.01)

(58) Field of Classification Search
CPC ...... Y10T 16/61; Y10T 16/625; Y10T 16/628; E05C 17/16; E05C 17/52; E05C 17/54;
(Continued)

(56) References Cited

U.S. PATENT DOCUMENTS 1,515,091 A * 11/1924 Brower ................... E05C 17/44
                                                           292/204
1,553,341 A *  9/1925 Vavra .................... E05C 17/443
                                                            292/71

(Continued)

OTHER PUBLICATIONS

International Search Report for PCT/US2018/12468, dated Mar. 13, 2018.
Written Opinion for PCT/US2018/12468, dated Mar. 13, 2018.

*Primary Examiner* — Chuck Y Mah
(74) *Attorney, Agent, or Firm* — John H. Choi & Associates (57) ABSTRACT

A support apparatus comprising an engagement member having a plurality of walls integrally formed with each other and a support member. The support member includes a bracket member pivotably coupled to the engagement member and a leg member pivotably coupled to the bracket member. The bracket member comprises a plurality of fixing apertures corresponding to a fixing member extending from the engagement member. Each fixing aperture is configured to receive the fixing member. A pivot aperture is provided for receiving a pivot member which is configured to be received by a pivot support positioned on the engagement member. A biasing member is coupled to the pivot member such that the pivot member is movable with the bracket member away from the engagement member and such that the bracket member is rotatable when the pivot member is moved away from the engagement member. The leg member is adjustably extendable.

15 Claims, 13 Drawing Sheets

(51) Int. Cl.
*E05C 17/54* (2006.01)
*E05C 17/44* (2006.01)
*E05C 19/18* (2006.01)
*F16M 13/02* (2006.01)

(58) Field of Classification Search
CPC ........ E05C 17/60; E05C 17/64; E05C 17/443; E05C 19/188; E05Y 220/222; E05Y 220/224; E05Y 2900/132; F16M 13/002
See application file for complete search history.

(56) References Cited

U.S. PATENT DOCUMENTS

| | | | | |
|---|---|---|---|---|
| 1,687,517 A * | 10/1928 | Sasgen | ................ | E05C 17/443 292/338 |
| 1,876,173 A * | 9/1932 | Sasgen | ................ | E05C 17/443 292/338 |
| 1,985,164 A * | 12/1934 | Green | ................ | E05C 17/443 292/338 |
| 2,097,349 A * | 10/1937 | Sladek | ................ | E05C 17/443 292/338 |
| 2,121,490 A * | 6/1938 | Sasgen | ................ | E05C 17/443 292/338 |
| 2,709,615 A * | 5/1955 | Barnes, Jr. | ............ | E05C 17/443 292/339 |
| 2,762,641 A * | 9/1956 | Gilmour | ............... | E05C 17/443 292/63 |
| 3,006,676 A * | 10/1961 | Germock, Jr. | ........ | E05C 17/443 292/338 |
| 3,141,188 A | 7/1964 | Gray | | |
| 3,357,732 A * | 12/1967 | Seal | ........................ | E05C 17/50 292/60 |
| 4,673,203 A * | 6/1987 | Chezem | ................ | E05C 17/443 292/338 |
| 5,542,725 A * | 8/1996 | Ballew | .................... | B25B 5/068 292/288 |
| 5,590,928 A * | 1/1997 | Voiculescu | ............ | E05C 17/446 292/178 |
| 5,673,952 A | 10/1997 | Chezem et al. | | |
| 5,771,533 A * | 6/1998 | Kuang-Pin | ............ | E05C 17/443 16/82 |
| 6,120,072 A * | 9/2000 | Benedict | ................ | E05C 17/443 292/338 |
| 7,065,830 B2 * | 6/2006 | Bushey | ................ | E05C 17/443 16/82 |
| 7,938,461 B2 * | 5/2011 | Ollinger | ................... | E05C 17/44 16/82 |
| 8,186,011 B2 * | 5/2012 | Rooney | ................ | E05C 17/443 16/82 |
| 8,656,555 B2 * | 2/2014 | Brown | ....................... | E05F 5/06 16/82 |
| 9,163,438 B2 * | 10/2015 | Mackay | .................. | E05C 17/44 |
| 10,400,496 B2 * | 9/2019 | Kuta | ........................ | E05C 17/46 |
| 2009/0139050 A1 * | 6/2009 | Junkins | ................... | E05C 17/54 16/84 |
| 2011/0278866 A1 | 11/2011 | Lee | | |
| 2014/0001775 A1 * | 1/2014 | Mullenbach | ........... | E05C 19/188 292/288 |
| 2014/0375070 A1 | 12/2014 | Hatton et al. | | |
| 2016/0215538 A1 * | 7/2016 | Pistone | ................. | E05C 17/443 |

* cited by examiner

SUPPORT APPARATUS

CROSS-REFERENCE TO RELATED APPLICATION

This application is a 371 application which claims priority to PCT/US2018/012468, filed Jan. 5, 2018, which claims priority to U.S. Provisional Application No. 62/442,480 filed on Jan. 5, 2017, which is incorporated by reference in its entirety.

FIELD

The present disclosure relates to the field of supports, in particular to a removable stop for doors, windows and the like.

BACKGROUND

Kick-down doorstops consist of an articulating leg mounted to a door. In the disengaged position, the distal end of the leg lays against the door and away from the ground. In the engaged position, the distal end of the leg lays against the ground. Kick-down doorstops enable swinging doors that automatically revert to a closed position to remain in an open or partially open position. Alternatively, doorstops can be used to prevent doors in a closed position from opening, functioning as a security measure.

Currently, kick-down doorstops are permanents affixed to doors by means of screws. This poses a number of problems. First, installation requires tools including drills and screwdriver. Second, removal of the doorstop leaves permanent unsightly holes in the door. This is particularly a problem if the door is part of a rental property. Third, repair or replacement requires the screws to be removed then screwed in again after repair or replacement. This puts wear on the screw holes which may render them incapable of holding the screws securely. Fourth, repeated use of the doorstop places stress on the points of contact with the door which can damage the door and loosen the screws. Finally, doorstops in the prior art also do not function well when the support surface is uneven, for example, on a slope or decline. One reason why doorstops in the prior do not work properly on inclined surfaces is because the legs of the doorstops have a fixed length and therefore cannot be adjusted according to the characteristics of the engaging surface.

As can be seen, there is a need for a screw-less kick-down doorstop that can be easily installed and easily removed, and capable of use on uneven support surfaces.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

In general, the present invention provides a removable support apparatus or doorstop that can be installed without screws or other types of fasteners. The doorstop is secured to a side of a door by an engagement member or clamp. The doorstop can be rotated to work on any door regardless of which direction it opens and can be positioned on a bottom edge of a door or a side edge of a door. The leg of the doorstop separately rotates such that its distal end can be placed against the ground. The support apparatus of the present invention could also be used on windows and other objects that require a support to remain opened.

More specifically, the present invention provides a support apparatus comprising: an engagement member having at least three walls integrally formed with each other, the at least three walls forming a space therebetween for an object to be positioned therein; and a support member comprising: a bracket member operably coupled to the engagement member, and a leg member pivotably coupled to the bracket member.

In one aspect, the bracket member is pivotably coupled to the engagement member and is pivotable at least ninety degrees from an original state to a pivoted state.

In another aspect, the bracket member comprises a plurality of fixing apertures corresponding to a fixing member extending from the engagement member, each fixing aperture configured to receive the fixing member. The bracket member further comprises a pivot aperture for receiving a pivot member, the pivot member configured to be received by a pivot support positioned on the engagement member.

In one embodiment, a biasing member is coupled to the pivot member such that the pivot member is movable with the bracket member away from the engagement member such that the bracket member is rotatable when the pivot member is moved away from the engagement member. In another embodiment, the pivot member is centrally positioned on the bracket member.

The present invention also provides a support apparatus comprising: an engagement member having a plurality of walls integrally formed with each other, the plurality of walls forming a space therebetween; and a support member comprising: a bracket member operably coupled to the engagement member, and a leg member pivotably coupled to the bracket member.

In one aspect, the leg member is extendable. The leg member comprises an inner member extendable from an outer member, an upper end of the inner member being coupled to the bracket member. The inner member includes a plurality of grooves, each groove being predetermined and corresponding to an adjustable height setting of the leg member.

In one embodiment, a locking mechanism is provided for setting the height of the leg member. The locking mechanism comprises: a sleeve circumscribing an upper end of the outer member; and a biasing member positioned between the sleeve and the outer member; wherein the inner member is secured at an adjustable height setting when the biasing member is in a rested state and the inner member is movable when the biasing member is in a compressed state. An upper end of the outer member includes an opening, the opening configured to receive a securing member such that the securing member engages the sleeve on one side and the securing member engages the inner member on an opposing side. In one embodiment, the securing member is a ball bearing.

The present invention also provides a support apparatus comprising: an engagement member having a plurality of walls integrally formed with each other, the plurality of walls forming a space therebetween; and a support member comprising: a bracket member pivotably coupled to the engagement member, and a leg member pivotably coupled to the bracket member. The bracket member comprises: a plurality of fixing apertures corresponding to a fixing member extending from the engagement member, each fixing aperture configured to receive the fixing member; a pivot aperture for receiving a pivot member, the pivot member configured to be received by a pivot support positioned on the engagement member; and a biasing member coupled to the pivot member such that the pivot member is movable with the bracket member away from the engagement member such that the bracket member is rotatable when the pivot member is moved away from the engagement member. In one embodiment, the pivot member is positioned at a substantial center of the bracket member.

In another aspect, the leg member is extendable. The leg member comprises: an inner member extendable from an outer member, an upper end of the inner member being coupled to the bracket member, the inner member having a plurality of grooves, each groove being predetermined and corresponding to an adjustable height setting of the leg member; and a locking mechanism for setting the height of the leg member, the locking mechanism comprising: a sleeve circumscribing an upper end of the outer member, and a biasing member circumscribing the outer member and positioned between the sleeve and the outer member; wherein the inner member is secured at an adjustable height setting when the biasing member is in a rested state and the inner member is movable when the biasing member is in a compressed state. An upper end of the outer member includes an opening, the opening configured to receive a securing member such that the securing member engages the sleeve on one side and the securing member engages the inner member on an opposing side.

The foregoing has outlined rather broadly the more pertinent and important features of the present invention so that the detailed description of the invention that follows may be better understood and so that the present contribution to the art can be more fully appreciated.

Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent structures do not depart from the spirit and scope of the invention.

BRIEF DESCRIPTION OF DRAWINGS

The above and other objects, features and advantages of the present disclosure will be more apparent from the following detailed description taken in conjunction with the accompanying drawings, in which.

Unless stated otherwise, the features shown in the figures are not drawn to scale, but are shown for illustrative purposes only.

DETAILED DESCRIPTION

Exemplary embodiments are described herein to provide a detailed description of the present disclosure. Variations of these embodiments will be apparent to those of skill in the art. Moreover, certain terminology is used in the following description for convenience only and is not limiting. For example, the words "top" and "bottom" designate directions in the drawings to which reference is made. The word "a" is defined to mean "at least one." The terminology includes the words above specifically mentioned, derivatives thereof, and words of similar import.

Referring to the figures, in general, the support apparatus or doorstop of the present invention generally comprises: (i) an engagement member 200; (ii) a leg member 300; and (iii) a bracket member 400.

Referring to FIGS. 1-5, in one embodiment of the support apparatus 1 of the present invention, the engagement member 200 comprises: (i) a first wall 210; (ii) a second wall 220; (iii) a third wall 240; and (vi) a bracket catch 250. The first wall or clamp front surface 210 and second wall or clamp back surface 220 are coupled at their respective side edges to opposite edges of the third wall or clamp side surface 240. The bracket catch 250 is coupled to the outside surface of the clamp front surface 210. In this embodiment, the bracket catch 250 is a ring or washer fabricated to protrude from the clamp front surface 210 such that a space if formed between the bracket catch 250 and the clamp front surface 210. Each surface 210, 220, 240 and bracket catch 250 are formed integral to each other by known methods such as injection molding if plastic and welding if metal.

In an alternative embodiment, the doorstop 1 further comprises a clamp bottom surface (not shown) coupled to the respective bottom edges of the clamp front surface 210, clamp back surface 220, and clamp side surface 240 such that the clamp bottom surface and clamp side surface 240 are on adjacent edges of the clamp front surface 210 and clamp back surface 220. The clamp bottom surface can be removable to accommodate situations where there is insufficient clearance between the door and door frame to close the door with the clamp 200 attached to the door. Alternatively, the clamp side surface 240 could have overlapping surfaces coupled by spring mechanism or the like so that the depth of the clamp 200 could adjust to the thickness of the door.

Referring to FIGS. 2-5, the bracket member 400 is operably coupled to the engagement member or clamp 200. The bracket member 400 comprises: (i) a bracket front portion 420; and (ii) a bracket rear portion 430. The bracket rear portion 430 could be rotatably secured to the outside surface of the clamp front surface 210 within the bracket catch, as shown in some of the latter embodiments herein. It is preferred that the bracket rear portion 430 is a circular disk but it could take on other shapes as well so long as it is capable of being secured within the bracket catch 250 and rotatable therewithin. The bracket catch 250 can fix the bracket 400 in place or permit the bracket 400 to rotate while remaining flat against the clamp front surface 210.

Referring again to the FIGS. 2-5, the bracket front portion 420 includes a pair of flanges 422, 424 fixedly coupled to the bracket rear portion 430, preferably by injection molding or welding depending on the materials used. The flanges 422, 424 are substantially parallel to each other and shaped and sized substantially similar to each other.

Referring to the figures, the bracket member 400 is operably coupled to the leg member 300. The leg member 300 comprises: (i) a leg first end 310; (ii) a leg second end 320; (iii) an optional grip 330; and (iv) a pin 410. The leg first end 310 may be coupled to the optional grip 330 by means of glue, screw, button and button hole, or other means of coupling the grip 330 to the leg 300. The leg second end 320 is pivotably coupled to the bracket front portion 420 between the flanges 422, 424 by means of the pin 410. However, the leg second end 320 and bracket member 400 could be coupled by other means, for example, by a ball joint. Moreover, the leg 300 could be adjustable in length, as shown below in other embodiments, by constructing the leg 300 with one or more segments and coupling the segments by known means such as an adjustable threaded engagement.

The optional grip 330 may be made of the same material as the leg or a different material, such as rubber, silicon, or felt, to improve the frictional adherence to the ground or to protect the ground from damage. Moreover, the clamp 200, leg 300, and bracket 400 made be made of any substantially rigid material including metal, plastic, and wood.

Figure 1:
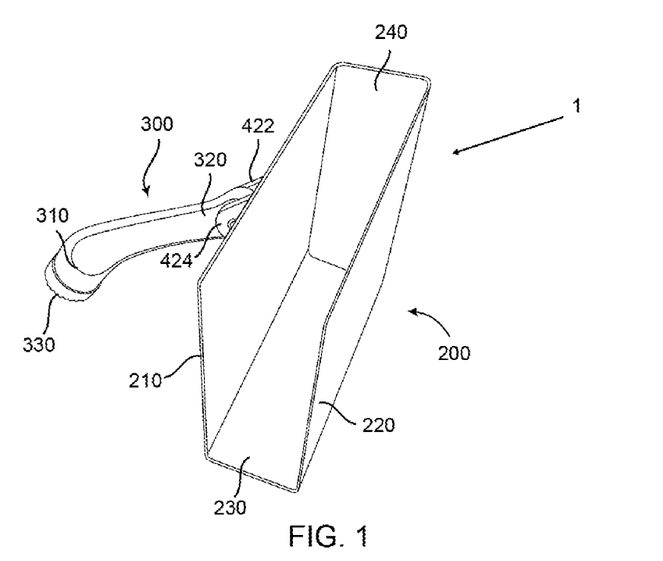
FIG. 1 is a right perspective view of an embodiment of a support apparatus or doorstop of the present invention in an engaged position.
Figure 2:
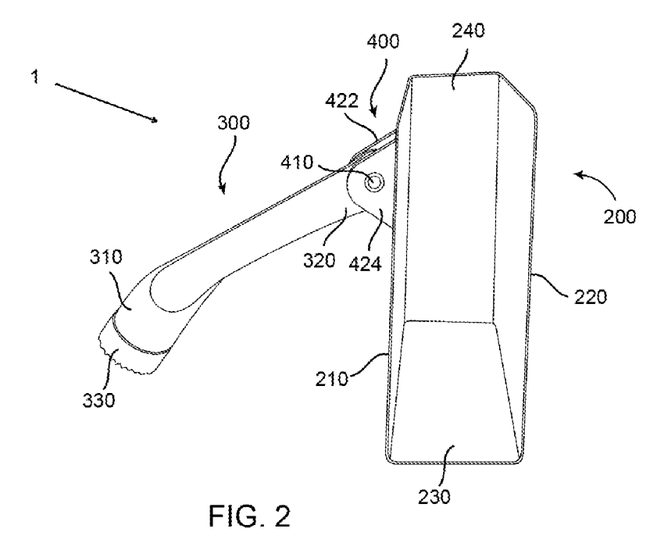
FIG. 2 is a right side view of the doorstop of FIG. 1.
Figure 3:
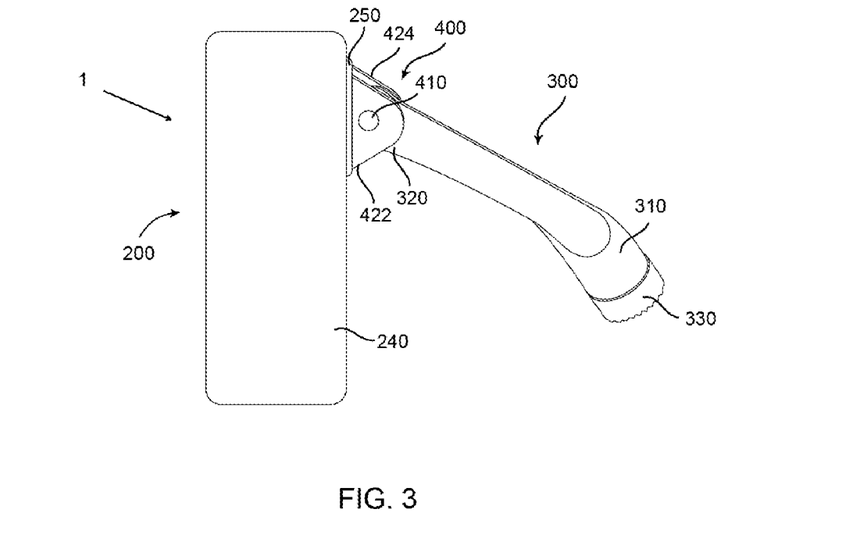
FIG. 3 is a left side view of the doorstop of FIG. 1.
Figure 4:
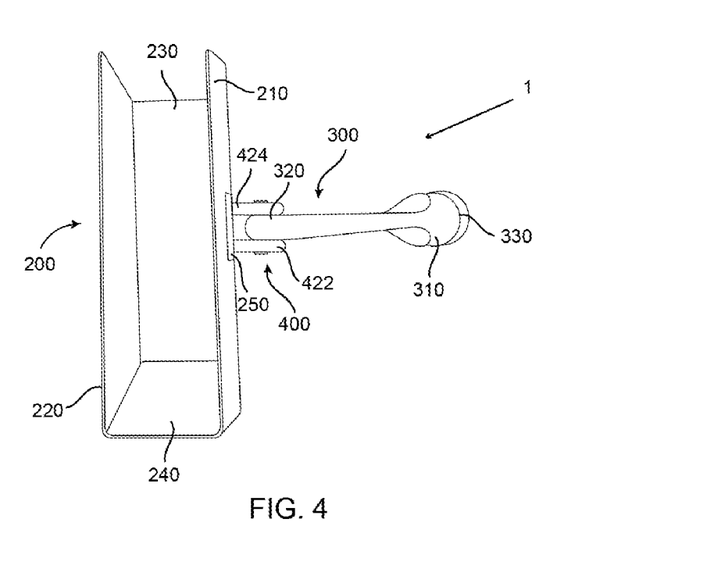
FIG. 4 is a top view of the doorstop of FIG. 1.
Figure 5:
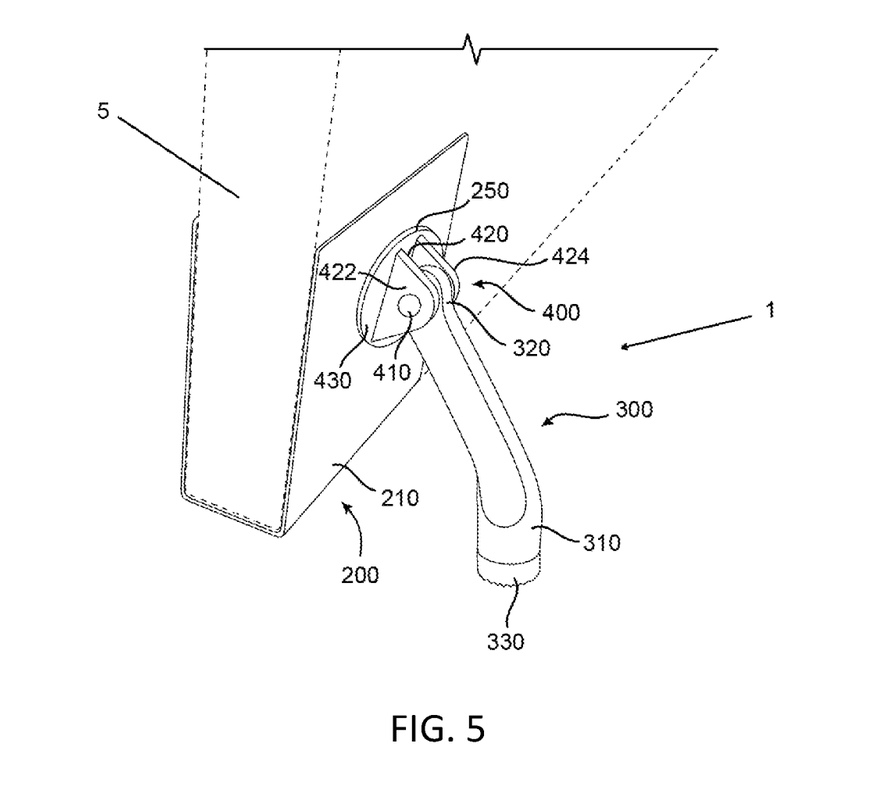
FIG. 5 is an illustration of doorstop of FIG. 1 in an engaged state.

Referring to FIG. 5, the engagement member or clamp 200 is frictionally coupled to the bottom corner of a door 5 opposite the hinge of the door. The clamp 200 may be of varying sizes to accommodate doors of different thicknesses. In another example, the doorstop shown in FIG. 5 could be positioned anywhere along a bottom or side of a door including at a position intermediate the door ends.

In operation, as shown in FIGS. 1-5, the leg member 300 is pivotably extended away from the door and the leg first end 310 engages the ground to hold the door 5 in place. In a disengaged position (not shown), the leg first end 310 is pivoted upward and away from the ground. Optionally, the doorstop can be removed from the door.

Figure 6:
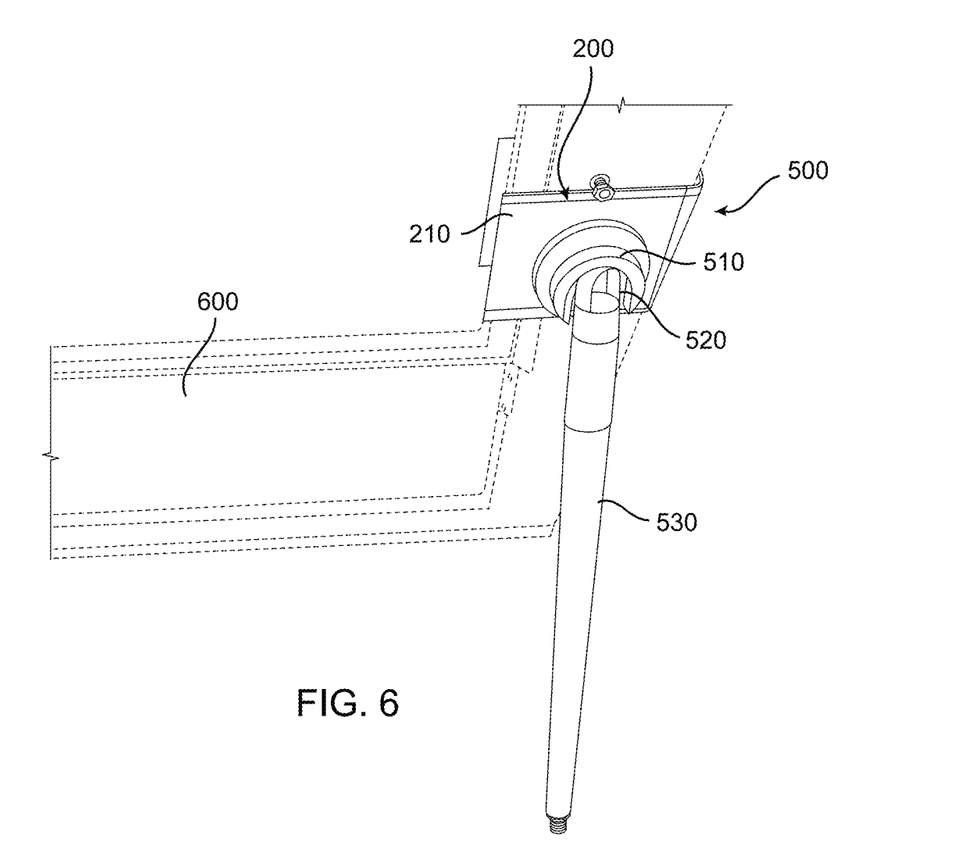
FIG. 6 is a front perspective view of another embodiment of a doorstop of the present invention in an engaged state.

Referring to FIG. 6, another embodiment of a doorstop 500 of the present invention is shown. In this embodiment, the engagement member or clamp 200 is substantially identically to the clamp 200 shown in FIG. 5. A bracket member 510 is fixed to the clamp front surface 210 by adhesive. However, other methods of engagement could be used to fix the two components together, including but not limited to fasteners such as screws, nails and the like. A back portion of the bracket member 510 is substantially flat and a front portion of the bracket member 510 includes a concave opening 520. The bracket member 510 is formed of a material capable of generating sufficient friction with components making contact therewith. In this embodiment, the bracket member 510 is rubber or synthetic rubber manufactured, for example, with plastics.

Still referring to FIG. 6, the doorstop 500 also includes a leg member 530. The leg member 530 could be any elongated component, for example, the stick portion of a broom. Furthermore, the leg member 530 could be of any length and could be adjustable in length by constructing the leg member 530 with one or more segments and coupling the segments by known means such as an adjustable threaded engagement.

In operation, as shown in FIG. 6, the clamp 200 is engaged with a free end of a door 600. A free end of the leg member 530 is inserted into the opening 520 of the bracket member 510. An opposite free end of the leg member 530 is secured to a ground surface. In this configuration, the leg member 530 is secured to the bracket member 510 by frictional engagement between the two components. In this embodiment, a leg member of any length could be used with the clamp 200 and bracket member 510 as the position of the clamp 200 could be adjusted to accommodate the length of any leg member.

The bracket rear portion 430 may rotate 90 degrees such that either the clamp bottom surface (not shown) or the clamp side surface 240 could be positioned parallel to the ground. This permits the clamp 200 to be rotated to accommodate a variety of doors. Alternatively, the bracket rear portion 430 may rotate more than 90 degrees or may be fixed.

Figure 7:
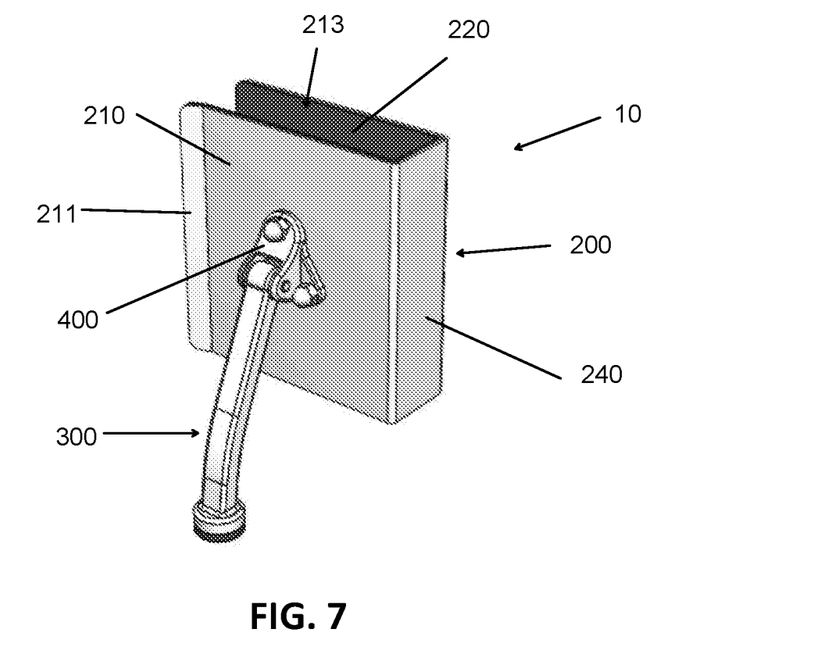
FIG. 7 is a front perspective view of another embodiment of a support apparatus or doorstop of the present invention.
Figure 8:
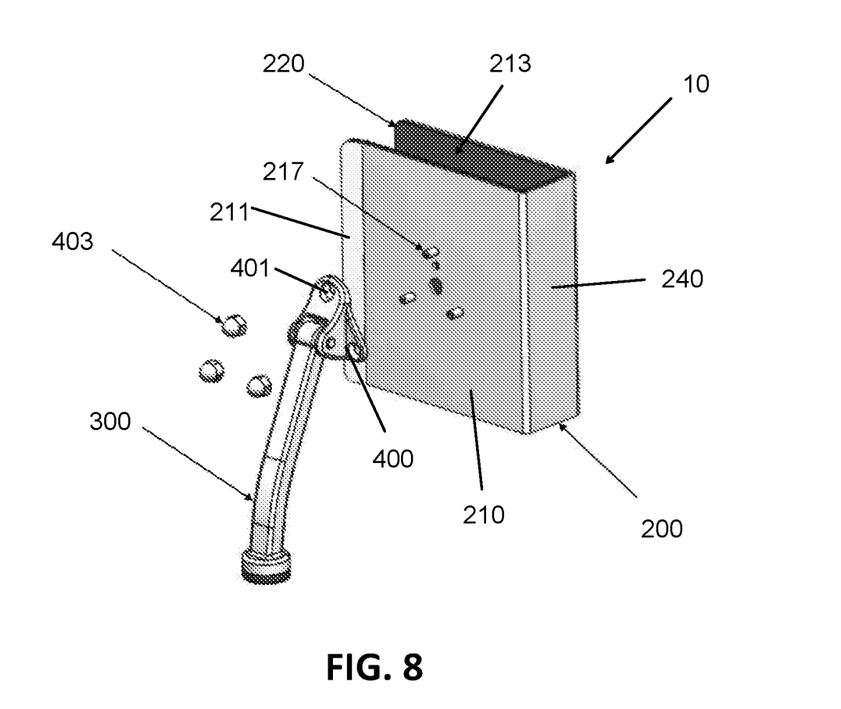
FIG. 8 is an exploded view of the doorstop of FIG. 7.
Figure 9:
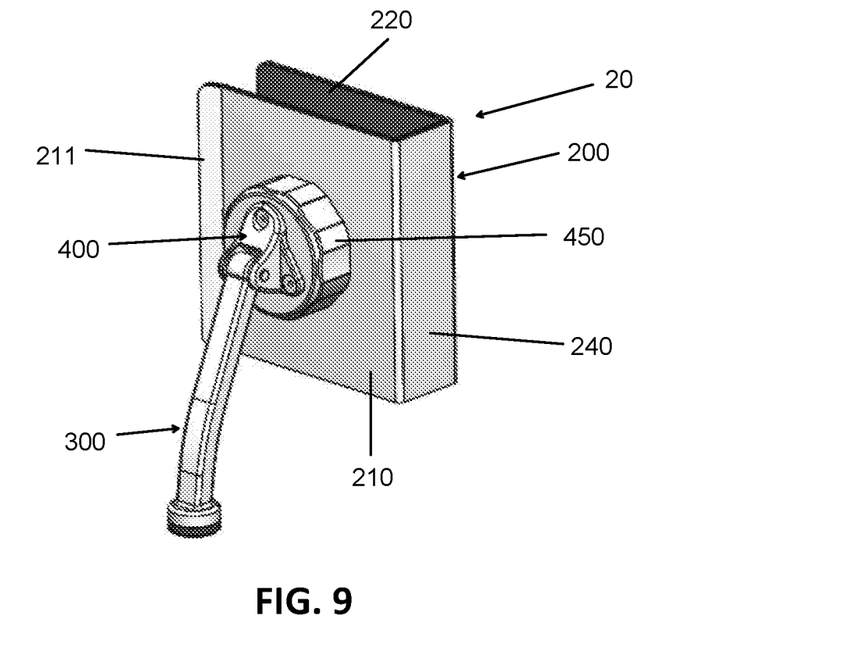
FIG. 9 is a front perspective view of another embodiment of a support apparatus or doorstop of the present invention.

Referring to FIGS. 7 and 8, another embodiment of a support apparatus 10 of the present invention is shown. As in the embodiment shown in FIGS. 1-5, the engagement member 200 includes a front wall 210, a back wall 220 and a side wall 240 integrally coupled together, forming a space 213 therebetween. The front wall includes an angled lip 211 for accommodating a user with ease of installing the support apparatus 10 onto an object. That is, the user is not required to align the space 213 with the object. Instead, the support apparatus 10 could be initially installed at an angle matching the angle of the lip 211.

Figure 21:
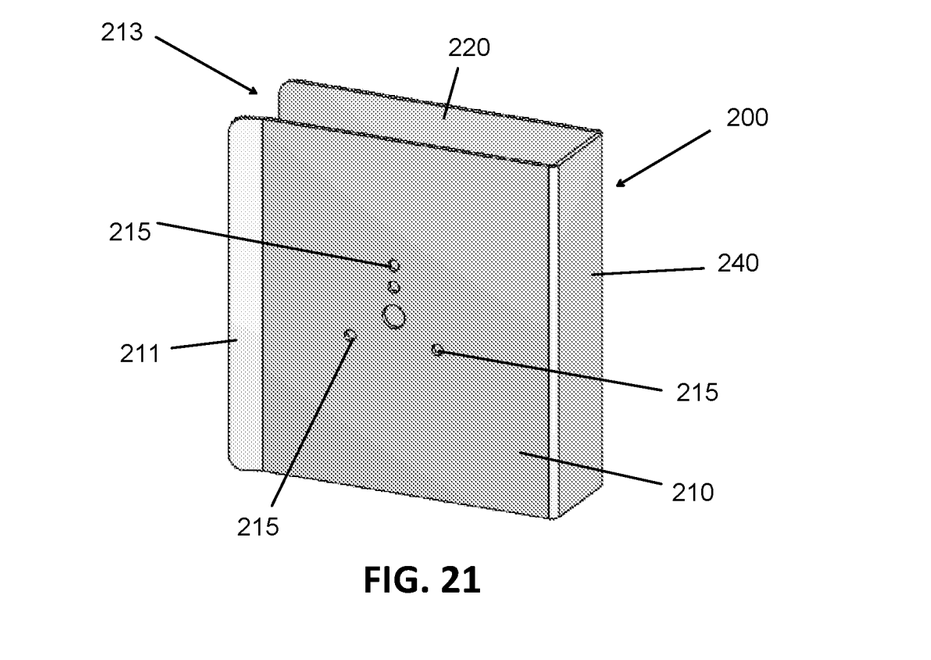
FIG. 21 is a front perspective view of an embodiment of an engagement member of certain embodiments of the support apparatus or doorstop of the present invention.
Figure 22:
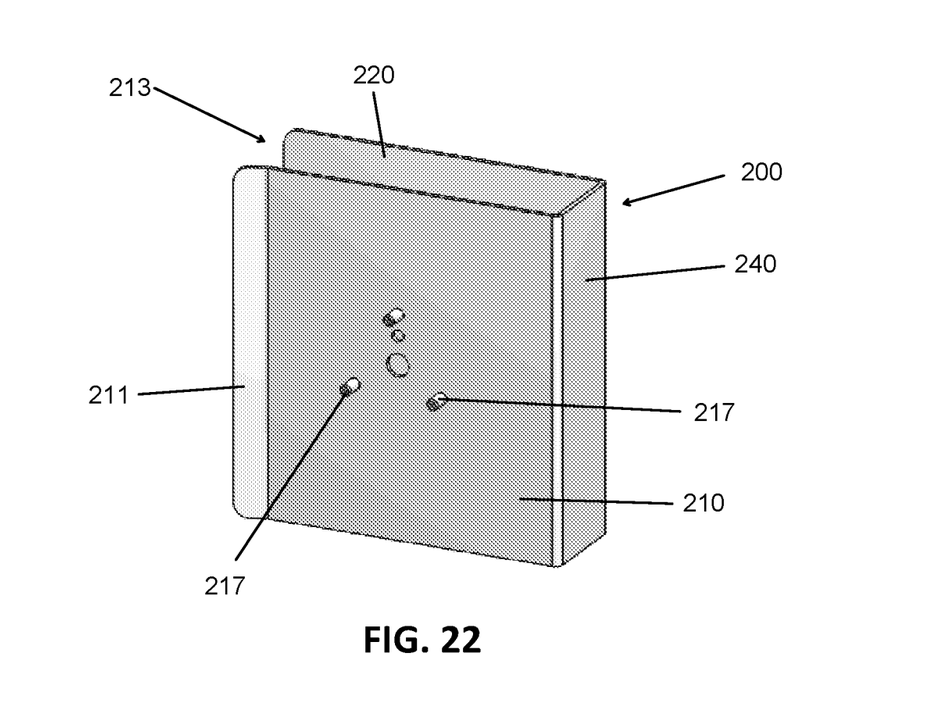
FIG. 22 is a front perspective view of the engagement member of FIG. 21 with fixing members.

Referring to FIGS. 8, 21 and 22, the front wall 210 is provided with three apertures 215 where fasteners 217 are secured therethrough. A support member includes a bracket member 400 pivotably coupled with a leg member 300 as described above with respect to the embodiment in FIGS. 1-5. The bracket member 400 includes apertures 401 such that the fasteners 217 are extended therethough and are further coupled with respective nuts 403 to form a fixed engagement between the bracket member 400 and the engagement member 200. The apertures 215 could be threaded to provide additional support.

Referring to FIGS. 9-13, another embodiment of a support apparatus 20 of the present invention is shown. In this embodiment, the engagement member 200 and the support member (bracket member 400 and leg member 300) are substantially the same as that of the engagement member 200 and support member (bracket member 400 and leg member 300) of the embodiment shown in FIGS. 7 and 8.

However, the bracket member 400 includes a rotatable bracket catch or attachment 450.

Figure 12:
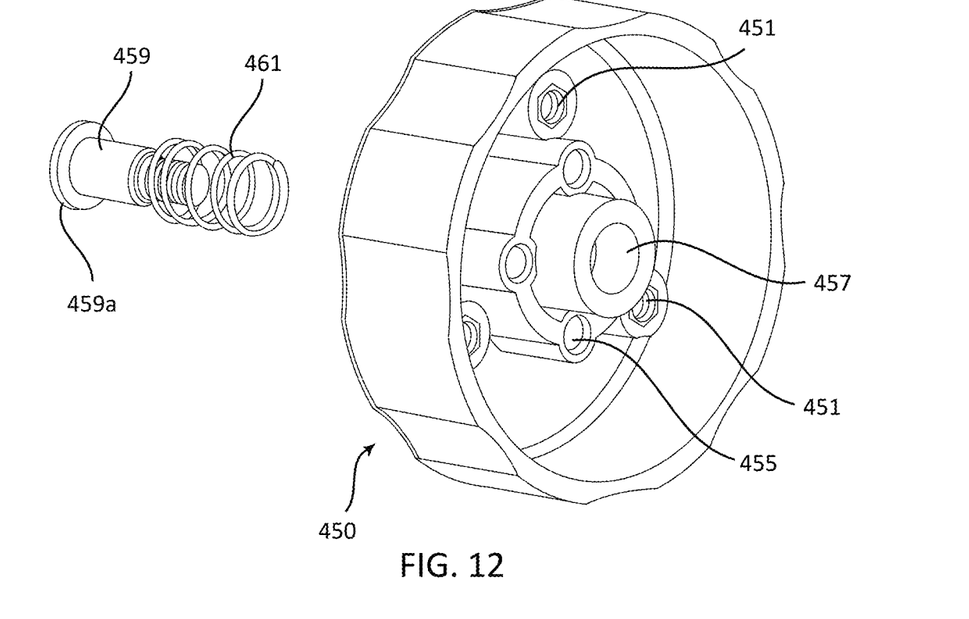
FIG. 12 is a rear perspective view of a bracket attachment of the doorstop of FIG. 9.
Figure 13:
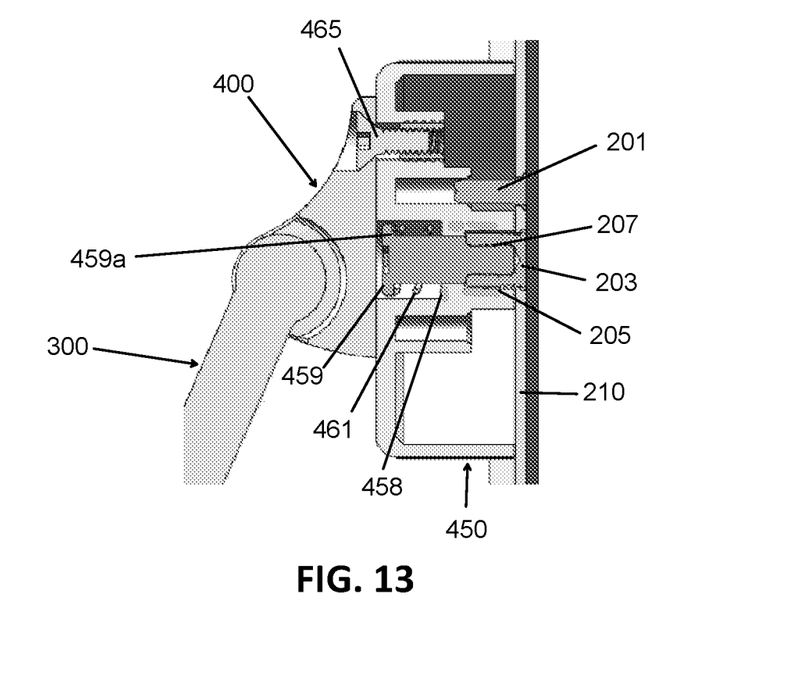
FIG. 13 is a sectional view of the doorstop of FIG. 9.

Referring to FIG. 12, the bracket attachment 450 is substantially cylindrical and includes three apertures 451 corresponding to the apertures 401 of the bracket member 400. However, the bracket attachment 450 could take on other shapes and sizes. As such, the bracket member 400 is fixed to the bracket attachment 450 via fasteners 453. The bracket attachment 450 further includes three fixing apertures 455 positioned on an inner section of the bracket attachment 450. Also provided on an inner section of the bracket attachment 450 is a pivot aperture 457 having an inner lip 458, as shown in FIG. 13. In this embodiment, the pivot aperture 457 is positioned at a substantial center of the bracket attachment 450. One of ordinary skill in the art will recognize that the number of apertures 401 and fixing apertures 455 could be varied.

Figure 10:
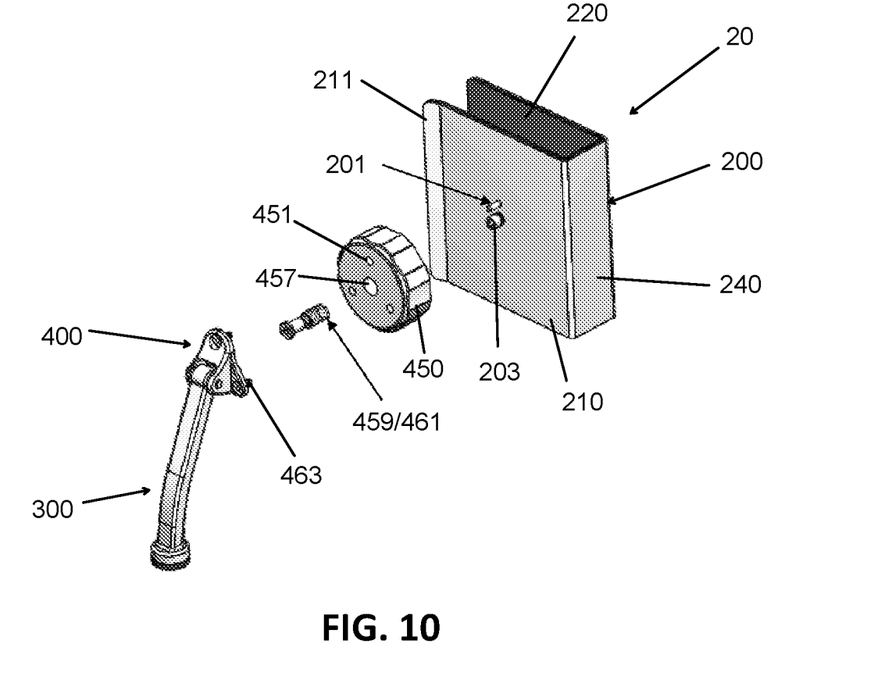
FIG. 10 is an exploded view of the doorstop of FIG. 9.
Figure 11:
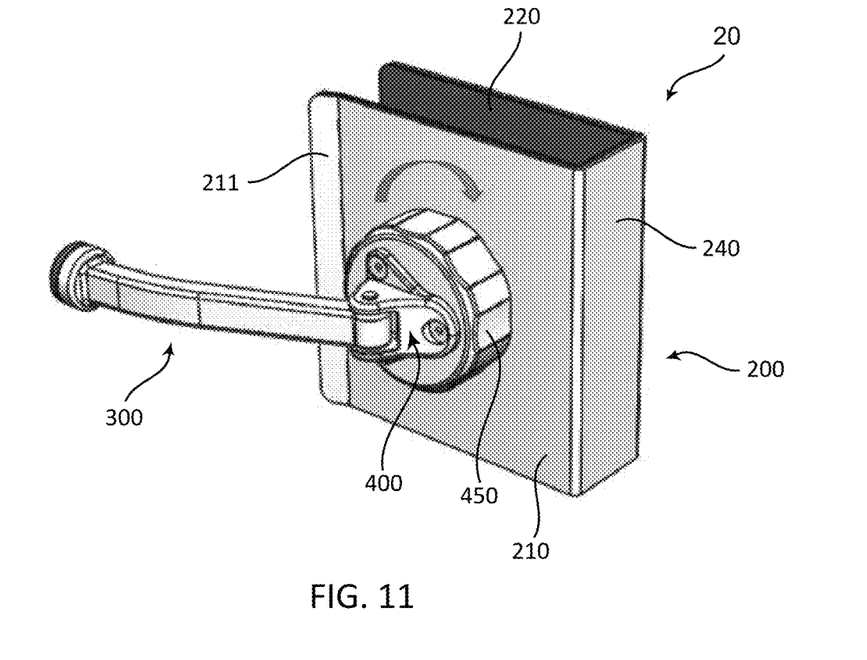
FIG. 11 is a front perspective view of the doorstop of FIG. 9 in a pivoted state.
Figure 23:
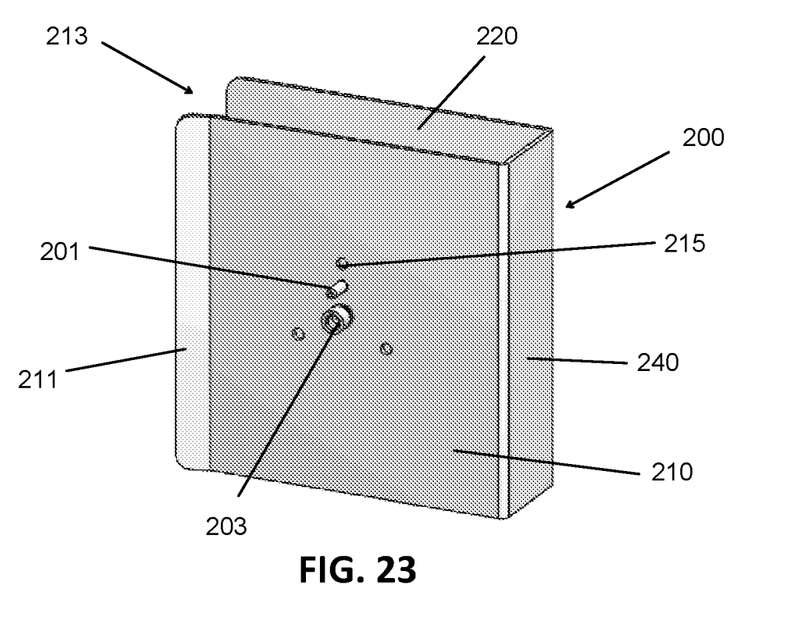
FIG. 23 is a front perspective view of the engagement member of FIG. 21 with a fixing member and a pivot support.

Referring to FIGS. 10 and 23, the engagement member 200 is provided with a fixing member 201 extending from the front wall 210. The fixing member 201 is a solid cylindrical pin and is fixed to the front wall 201 by a pressing method. The engagement member is 200 also provided with a pivot support 203 extending from the front wall 210 that is fixed therein by a pressing method. The pivot support 203 includes an outer portion 205 and a threaded inner portion 207 that is substantially hollow, as shown in FIG. 13.

Referring to FIGS. 12 and 13, a biasing member 461 circumscribes a threaded pivot member 459 and the aforementioned combination is inserted through the pivot aperture 457. The pivot member 459 is fixed within the inner portion 207 of the pivot support 203 via matching threads. The biasing member 461 is positioned between the pivot member head 459a and the bracket attachment inner lip 458. The fixing member 201 of the engagement member 200 is positioned within one of the fixing apertures 455 of the bracket attachment 450. The bracket member 400 is then secured to the bracket attachment 450 via fasteners 465. As such, the bracket member 400 is rotatably adjustable. More specifically, the orientation of the bracket member 400 can be adjusted ninety degrees in opposing directions by pulling the bracket attachment 450, turning the same in either direction, and securing the fixing member 201 in a desired fixing aperture 455. That is, the bracket attachment 450 is movable due to the biasing member 461 being engaged with the inner lip 458 of the pivot aperture 457. With this configuration, the support apparatus 20 is can be used in at least three different orientations to accommodate for doors, windows and the like that are in different positions, e.g., left and right opening doors.

Figure 14:
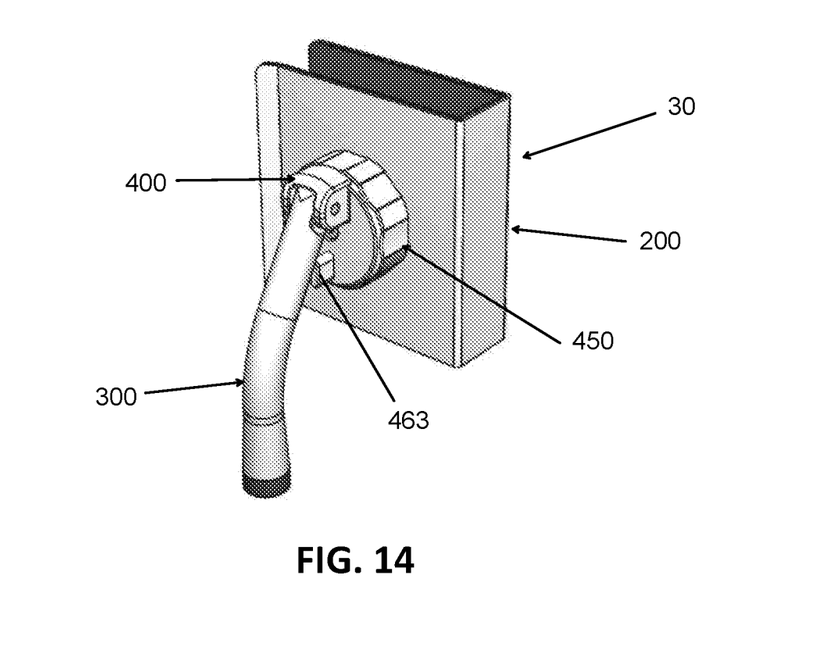
FIG. 14 is a front perspective view of another embodiment of a support apparatus or doorstop of the present invention.
Figure 15:
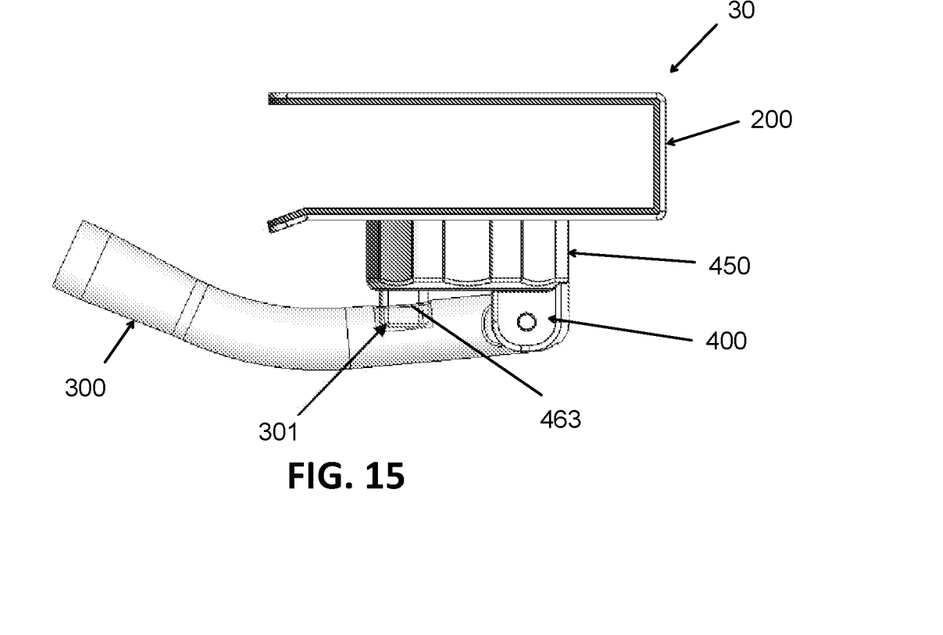
FIG. 15 is a top and partial sectional view of the doorstop of FIG. 14 in a pivoted state.
Figure 16:
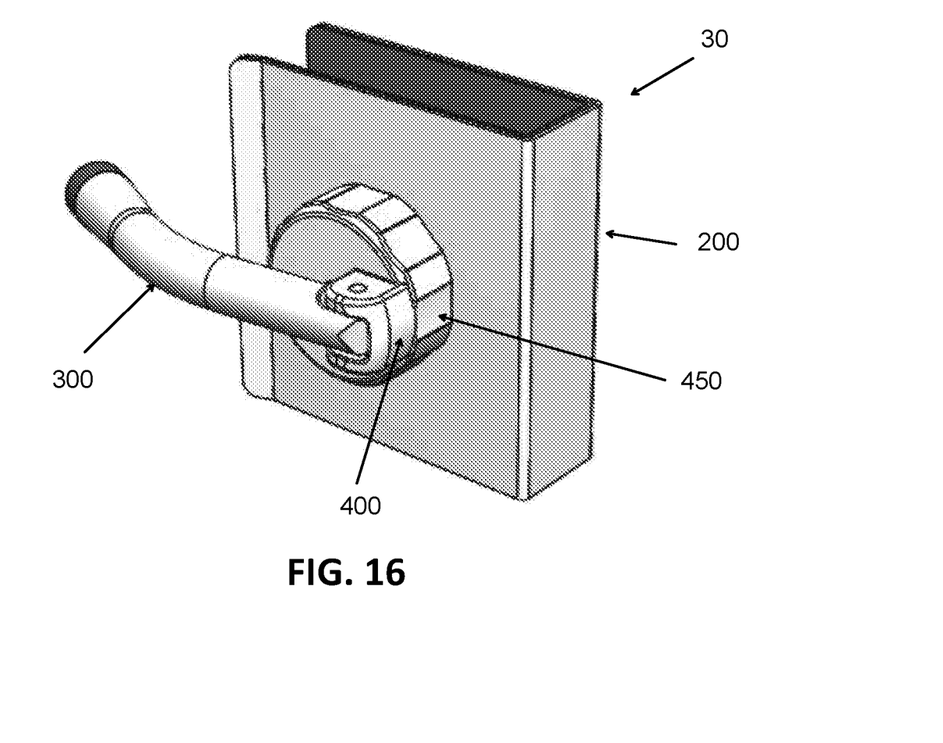
FIG. 16 is a front perspective view of the doorstop of FIG. 14 in a pivoted state.
Figure 17:
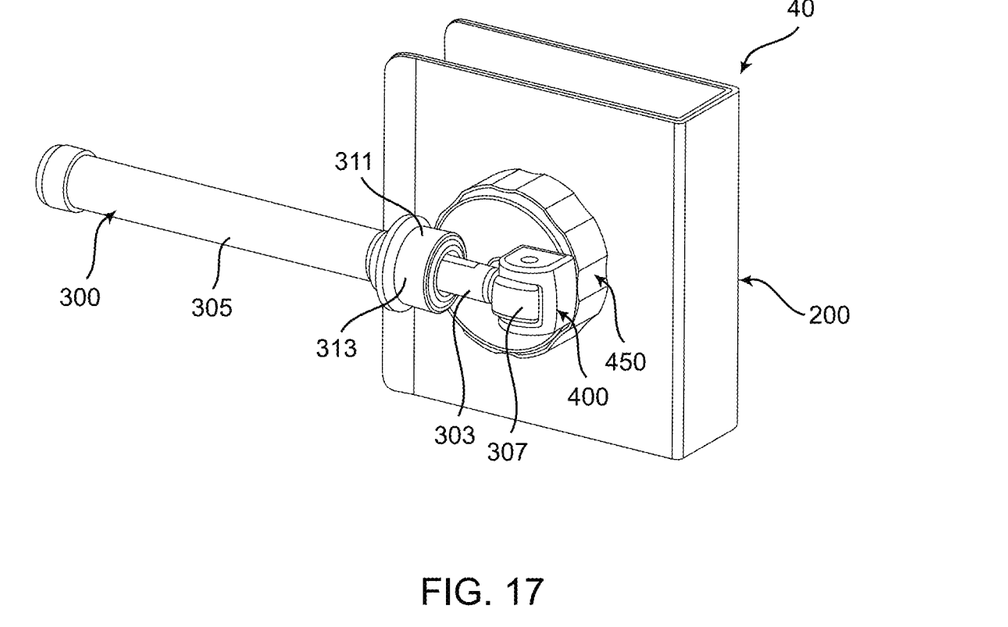
FIG. 17 is a front perspective view of another embodiment of a support apparatus or doorstop of the present invention in a pivoted state.
Figure 18:
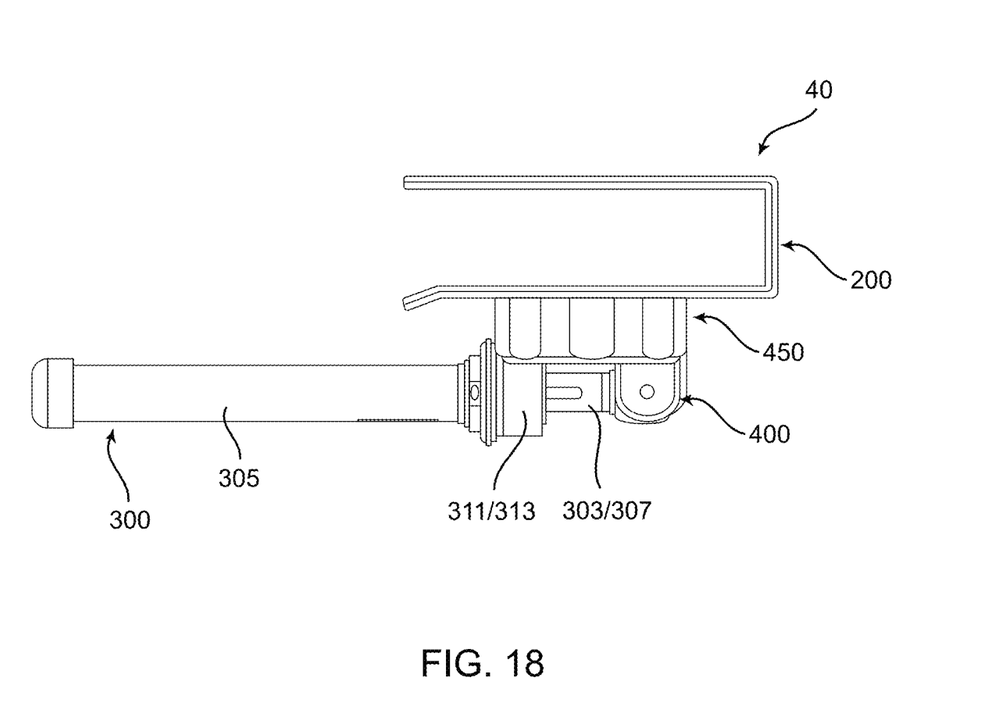
FIG. 18 is a top view of the doorstop of FIG. 17.

Referring to FIGS. 14-16, another embodiment of a support apparatus 30 of the present invention is shown. In this embodiment, the engagement member 200, leg member 300 and bracket attachment 450, as well as the construction of the same are substantially the same as that of the embodiment shown in FIGS. 9-13. However, in this embodiment, the bracket member 400 is integrally formed with the bracket attachment 450. That is, if the bracket member 400 and the bracket attachment 450 are metal, the two components are welded together. If the components are plastic, they are molded together via methods such as injection molding.

Still referring to FIGS. 14-16, the bracket attachment 450 also includes a protrusion 463 extending toward the leg member 300. As well, the leg member includes a matching indent 301 positioned on an inner portion facing the bracket attachment 450. The protrusion 463 and indent 301 are engaged to form a lock when the support apparatus 30 is not in use, as shown in FIG. 16.

Referring to FIGS. 17-20, another embodiment of a support apparatus 40 of the present invention is shown. In this embodiment, the engagement member 200, bracket member 400 and bracket attachment 450, as well as the construction of the same are substantially the same as that of the embodiment shown in FIGS. 14-16. However, in the embodiment, the leg member 300 is extendable.

Still referring to FIGS. 17-20, the leg member 300 includes a substantially solid inner member 303 extendable from a substantially cylindrical outer member 305. An upper end 307 of the inner member 303 is pivotably coupled to the bracket member 400. The inner member 303 includes a plurality of grooves 309. Each groove is predetermined and corresponds to an adjustable height setting of the leg member 300. The upper end 315 of the outer member 305 includes voids or openings that are each configured to receive securing members 321. In this embodiment, the securing members 321 are ball bearings. The upper end 315 of the outer member 305 also includes a lower engaging surface 323 positioned below the openings.

Figure 20:
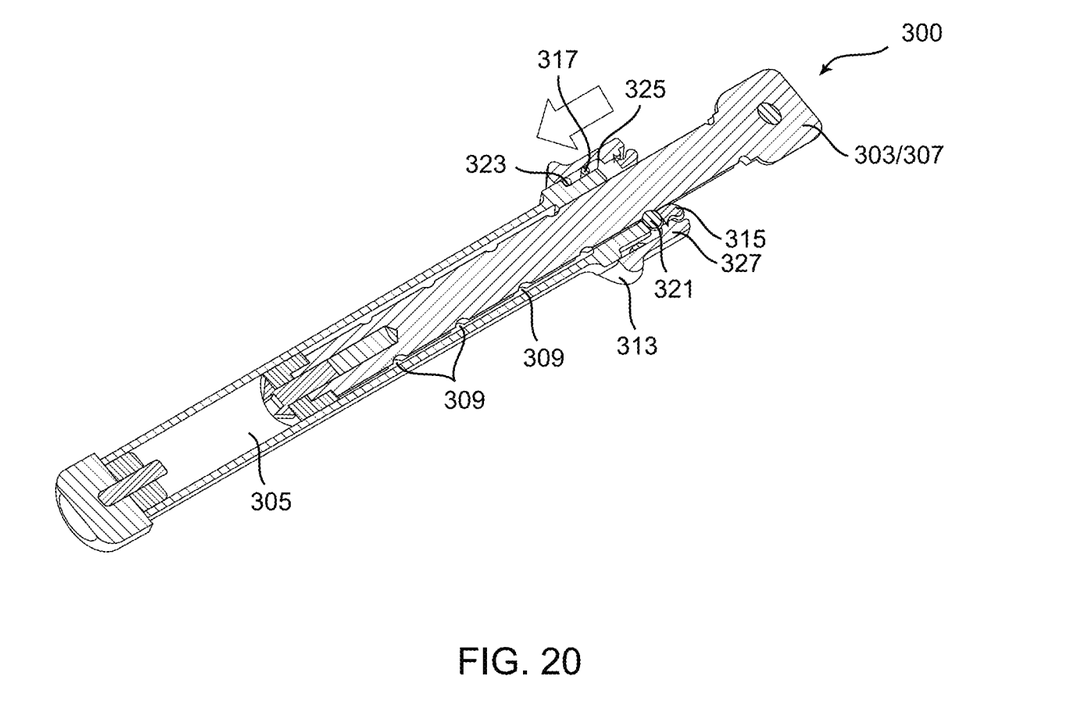
FIG. 20 is a sectional view of a leg member of the doorstop of FIG. 17.

As shown in FIG. 20, a locking mechanism 311 is provided for setting the height of the leg member 300. The locking mechanism 311 includes a sleeve 313 circumscribing an upper end 315 of the outer member 305. The sleeve 313 includes an upper engaging surface 325 resulting from an engagement portion 327 extending inward for engaging the securing members 321. A biasing member 317 is positioned between the sleeve 313 and the outer member 305 and engages the lower engaging surface 323 of the outer member 305 and the upper engaging surface 325 of the sleeve 313.

Figure 19:
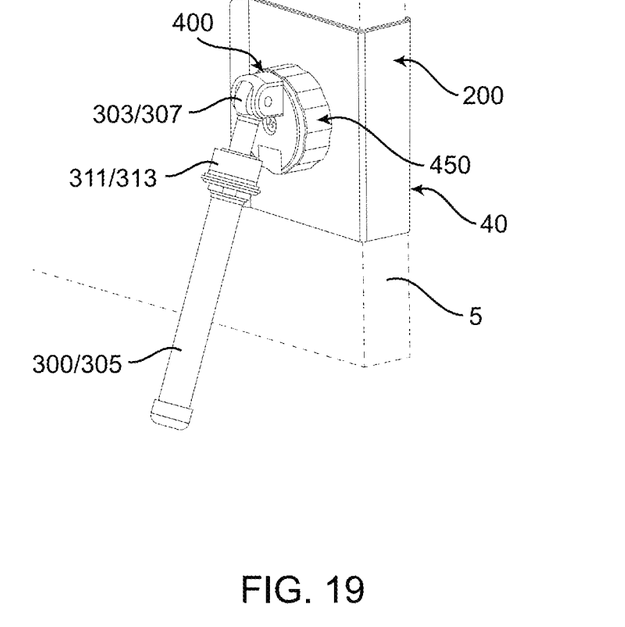
FIG. 19 is an illustration of the doorstop of FIG. 17 in an engaged state.

Still referring to FIG. 20, in this configuration, the leg member 300 is set at a desired height when the securing members 321 are positioned within corresponding grooves 309. The sleeve 313 is biased upward such that the engagement portion 327 engages the securing members 321 against the inner member 303. A user pulls down on the sleeve 313 thereby compressing the biasing member 317 and disengaging the engagement portion 327 from the securing members 321 to adjust the inner member's 303 position relative to the outer member 305 until a desired height is reached. The sleeve 313 is disengaged by the user such that the engagement portion 327 engages the securing members 321 against the grooves 309 corresponding to the desired height. As such, the length of the leg member 300 could be adjusted to accommodate the position of the support apparatus 40 when installed a door 5, for example, as shown in FIG. 19, or uneven surfaces.

Although this invention has been described in its exemplary forms with a certain degree of particularity, it is understood that the present disclosure has been made only by way of example and numerous changes in the details of construction and combination and arrangement of parts may be employed without departing from the spirit and scope of the invention.

The invention claimed is:

1. A support apparatus comprising:
   an engagement member having at least three walls integrally formed with each other, the at least three walls forming a space therebetween for an object to be positioned therein; and
   a support member comprising:
   a bracket member operably coupled to the engagement member, and a leg member pivotably coupled to the bracket member;
wherein the bracket member comprises a plurality of fixing apertures corresponding to a fixing member extending from the engagement member, each fixing aperture configured to receive the fixing member.

2. The support apparatus of claim 1, wherein the bracket member is pivotably coupled to the engagement member.

3. The support apparatus of claim 2, wherein the bracket member is pivotable at least ninety degrees from an original state to a pivoted state.

4. The support apparatus of claim 1, wherein the bracket member further comprises a pivot aperture for receiving a pivot member, the pivot member configured to be received by a pivot support positioned on the engagement member.

5. The support apparatus of claim 4, further comprising a biasing member coupled to the pivot member such that the pivot member is movable with the bracket member away from the engagement member such that the bracket member is rotatable when the pivot member is moved away from the engagement member.

6. The support apparatus of claim 4, wherein the pivot member is centrally positioned on the bracket member.

7. A support apparatus comprising:
an engagement member having a plurality of walls integrally formed with each other, the plurality of walls forming a space therebetween; and
a support member comprising:
a bracket member operably coupled to the engagement member,
a leg member pivotably coupled to the bracket member;
a locking mechanism for setting the height of the leg member, the locking mechanism comprising:
a sleeve circumscribing an upper end of the outer member; and
a biasing member positioned between the sleeve and the outer member;
wherein the leg member comprises an inner member extendable from an outer member, an upper end of the inner member being coupled to the bracket member;
wherein the inner member includes a plurality of grooves, each groove being predetermined and corresponding to an adjustable height setting of the leg member; and
wherein the inner member is secured at an adjustable height setting when the biasing member is in a rested state and the inner member is movable when the biasing member is in a compressed state.

8. The support apparatus of claim 7, wherein the leg member is extendable.

9. The support apparatus of claim 7, wherein an upper end of the outer member includes an opening, the opening configured to receive a securing member such that the securing member engages the sleeve on one side and the securing member engages the inner member on an opposing side.

10. The support apparatus of claim 9, wherein the securing member is a ball bearing.

11. A support apparatus comprising:
an engagement member having a plurality of walls integrally formed with each other, the plurality of walls forming a space therebetween; and
a support member comprising:
a bracket member pivotably coupled to the engagement member, and
a leg member pivotably coupled to the bracket member;
wherein the bracket member comprises:
a plurality of fixing apertures corresponding to a fixing member extending from the engagement member, each fixing aperture configured to receive the fixing member;
a pivot aperture for receiving a pivot member, the pivot member configured to be received by a pivot support positioned on the engagement member; and
a biasing member coupled to the pivot member such that the pivot member is movable with the bracket member away from the engagement member such that the bracket member is rotatable when the pivot member is moved away from the engagement member.

12. The support apparatus of claim 11, wherein the pivot member is positioned at a substantial center of the bracket member.

13. The support apparatus of claim 11, wherein the leg member is extendable.

14. A support apparatus comprising:
an engagement member having a plurality of walls integrally formed with each other, the plurality of walls forming a space therebetween; and
a support member comprising:
a bracket member pivotably coupled to the engagement member, and
a leg member pivotably coupled to the bracket member;
wherein the leg member comprises:
an inner member extendable from an outer member, an upper end of the inner member being coupled to the bracket member, the inner member having a plurality of grooves, each groove being predetermined and corresponding to an adjustable height setting of the leg member; and
a locking mechanism for setting the height of the leg member, the locking mechanism comprising: a sleeve circumscribing an upper end of the outer member, and a biasing member circumscribing the outer member and positioned between the sleeve and the outer member;
wherein the inner member is secured at an adjustable height setting when the biasing member is in a rested state and the inner member is movable when the biasing member is in a compressed state.

15. The support apparatus of claim 14, wherein an upper end of the outer member includes an opening, the opening configured to receive a securing member such that the securing member engages the sleeve on one side and the securing member engages the inner member on an opposing side.

* * * * *